United States Patent
Sykes et al.

(10) Patent No.: US 11,242,941 B2
(45) Date of Patent: Feb. 8, 2022

(54) METHOD OF ADAPTIVELY SAMPLING DATA TO DETERMINE THE START OF INJECTION IN A SOLENOID ACTUATED VALVE

(71) Applicant: DELPHI TECHNOLOGIES IP LIMITED, St. Michael (BB)

(72) Inventors: Martin A. Sykes, Rainham (GB); Peter Knowles, Herne Bay (GB)

(73) Assignee: DELPHI TECHNOLOGIES IP LIMITED

( * ) Notice: Subject to any disclaimer, the term of this patent is extended or adjusted under 35 U.S.C. 154(b) by 214 days.

(21) Appl. No.: 16/628,097

(22) PCT Filed: Jul. 4, 2018

(86) PCT No.: PCT/EP2018/068127
§ 371 (c)(1),
(2) Date: Jan. 2, 2020

(87) PCT Pub. No.: WO2019/008057
PCT Pub. Date: Jan. 10, 2019

(65) Prior Publication Data
US 2020/0124205 A1    Apr. 23, 2020

(30) Foreign Application Priority Data
Jul. 5, 2017    (GB) ..................... 1710796

(51) Int. Cl.
*F16K 37/00*    (2006.01)
*F01N 9/00*    (2006.01)
(Continued)

(52) U.S. Cl.
CPC ........ *F16K 37/0033* (2013.01); *F01N 3/0253* (2013.01); *F01N 3/206* (2013.01);
(Continued)

(58) Field of Classification Search
CPC ...... F16K 37/0033; F16K 31/06; F01N 9/005; F01N 9/00; F01N 3/0253; F01N 3/206;
(Continued)

(56) References Cited

U.S. PATENT DOCUMENTS

| 2008/0073611 A1* | 3/2008 | Mayr | F16K 31/0655 251/129.01 |
| 2008/0148831 A1* | 6/2008 | Kekedjian | F02D 41/221 73/116.01 |

(Continued)

FOREIGN PATENT DOCUMENTS

| DE | 10252476 A1 | 5/2004 |
| DE | 102013201134 A1 | 7/2014 |
| DE | 102015204545 A1 | 9/2016 |

*Primary Examiner* — Jessica Cahill
*Assistant Examiner* — Patrick C Williams
(74) *Attorney, Agent, or Firm* — Joshua M. Haines (57) ABSTRACT

A method of adaptively sampling data to determine the start of injection in a solenoid actuated valve of a fluid injector includes, in an operating cycle or portion thereof of the valve, sampling the signal of current through a solenoid of the valve at sampling points having a pre-defined interval therebetween. At each sampling point, determining the value of the first derivative of current and detecting the sampling point at which the first derivative achieves a maximum as the start of injection. Values of the first derivative of the sampling points immediately preceding and immediately following the start of injection are determined. In a subsequent operating cycle, synchronisation of sampling is altered to shift sampling times depending on the values of the first derivative of the sampling points immediately preceding and immediately following the start of injection.

7 Claims, 6 Drawing Sheets

(51) Int. Cl.
  *H01F 7/18*    (2006.01)
  *F01N 3/025*   (2006.01)
  *F02D 41/34*   (2006.01)
  *F02D 41/40*   (2006.01)
  *F02M 51/00*   (2006.01)
  *F01N 3/20*    (2006.01)
  *F16K 31/06*   (2006.01)
  *F02D 41/24*   (2006.01)
  *F02D 41/20*   (2006.01)

(52) U.S. Cl.
  CPC ............... *F01N 9/00* (2013.01); *F01N 9/005* (2013.01); *F02D 41/345* (2013.01); *F02D 41/401* (2013.01); *F02M 51/005* (2013.01); *F16K 31/06* (2013.01); *H01F 7/1844* (2013.01); *F01N 3/208* (2013.01); *F01N 2430/00* (2013.01); *F01N 2550/05* (2013.01); *F01N 2610/02* (2013.01); *F01N 2610/146* (2013.01); *F01N 2900/0402* (2013.01); *F01N 2900/0418* (2013.01); *F01N 2900/1821* (2013.01); *F02D 41/2451* (2013.01); *F02D 2041/2055* (2013.01); *F02D 2041/2058* (2013.01); *F02D 2250/14* (2013.01); *H01F 2007/1861* (2013.01); *Y02A 50/20* (2018.01); *Y02T 10/12* (2013.01); *Y02T 10/40* (2013.01)

(58) Field of Classification Search
  CPC ................. F01N 3/208; F01N 2610/02; F01N 2610/146; F01N 2250/05; F01N 2900/0402; F01N 2900/0418; F01N 2900/1821; F01N 2430/00; H01F 7/1844; H01F 2007/1861; F02D 41/345; F02D 41/401; F02D 41/2451; F02D 2250/14; F02D 2041/2055; F02D 2041/2058; F02M 51/005; Y02T 10/12; Y02T 10/40; Y02A 50/20
  See application file for complete search history.

(56) References Cited

U.S. PATENT DOCUMENTS

2009/0132180 A1   5/2009   Pearce et al.
2013/0269800 A1   10/2013  Fromont

* cited by examiner

METHOD OF ADAPTIVELY SAMPLING DATA TO DETERMINE THE START OF INJECTION IN A SOLENOID ACTUATED VALVE

CROSS REFERENCE TO RELATED APPLICATIONS

This application is a national stage application under 35 USC 371 of PCT Application No. PCT/EP2018/068127 having an international filing date of Jul. 4, 2018, which is designated in the United States and which claimed the benefit of GB Patent Application No. 1710796.2 filed on Jul. 5, 2017, the entire disclosures of each are hereby incorporated by reference in their entirety.

TECHNICAL FIELD

This invention relates to injector valves (dosers) used to inject a reductant such as urea into a vehicle exhaust system and in particular to a sampling method to determine accurately the point of inflection of the current through a solenoid for such an injector valve, for e.g. determining the start of injection.

BACKGROUND OF THE INVENTION

In modern engine systems it is common for injectors to inject reductant such as urea into the exhaust system for controlling emissions. The injector is often referred to as a doser and the systems which use these are typically referred to a SCR (selective catalytic reduction) systems. Such injectors are typically solenoid actuated injectors; where activation of a solenoid operates a valve to allow injection of reductant such as urea into the exhaust system.

It is known to detect the state start of injection of the doser (reductant injector) by determining the point of inflection in the current/voltage trace (current flowing through the injector solenoid). So in other words it is known to detect the start of injection using the point of inflection on the current trace of a urea doser. Typically the resolution of the start of injections (SOI) detection is defined by the frequency of the current sampling. The greater the sampling frequency the more accurate the detection is, i.e. if the current it sampled in 5 μs (200 kHz) then the best resolution of the SOI is 5 μs.

Typically in an automotive environment the microprocessor resources are limited. Therefore the number of current samples and the frequency of the samples are limited.

It is an object of the invention to improve the accuracy of determining the SOI in systems where the microprocessor limits the current sampling intervals so as to improve the accuracy of SOI detection despite limited resources and resolution of sampling interval.

SUMMARY OF THE INVENTION

In one aspect is provided a method of adaptively sampling data to determine the start of injection in a solenoid actuated valve of a fluid injector comprising:

a) in an operating cycle or portion thereof of said valve, sampling the signal of current I through a solenoid of the solenoid actuated valve at sampling points, said sampling points having a pre-defined interval therebetween;

b) at each sampling point determining the value of the first derivative of current dI/dt;

c) detecting the sampling point at which dI/dt achieves a maximum and determining this point as the start of injection;

d) determining the value of dI/dt at the sampling point immediately preceding said sampling point of step c), $(dI/dt_{(z-1)})$ e) determining the value of dI/dt at the sampling point immediately following said sampling point of step c), $(dI/dt_{(z+1)})$ f) in a subsequent operating cycle altering the synchronisation of said sampling to shift the sampling times time wise depending on the values found in steps d) and e).

In step f) if the value in step d) is greater than the value in step e), the sampling times may be shifted earlier in time by a set increment.

In step f) if the value in step d) is smaller than the value in step e), sampling times may be shifted forward in time by a set increment.

Said injector may be a reductant injector adapted to inject liquid reductant into the exhaust of a vehicle.

BRIEF DESCRIPTION OF THE DRAWINGS

The present invention is now described by way of example with reference to the accompanying drawings in which.

DESCRIPTION OF PREFERRED EMBODIMENTS

Figure 1:
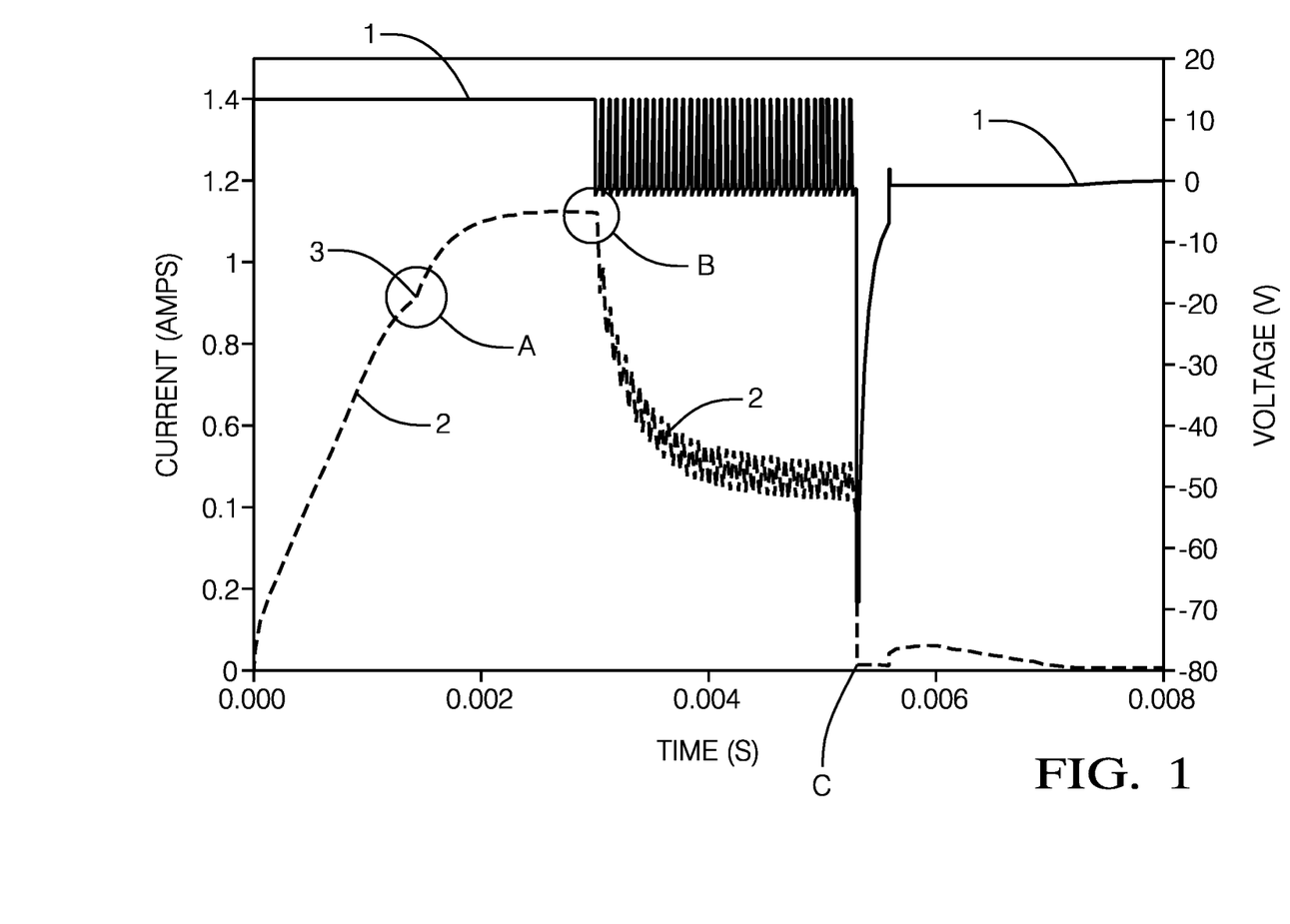
FIG. 1 shows a plot of both the voltage applied/present across the terminals of a reductant injector (solenoid) as well as the resultant current

FIG. 1 shows a plot of both the voltage 1 applied/present across the terminals of a reductant injector (solenoid) as well as the resultant current 2 i.e. thought the doser (injector solenoid). As can be seen the doser is activated by providing an initial step increase in voltage. The current through the doser (injector solenoid) consequently ramps up to reach a peak value. During the time indicated by circle A, in particular the point of inflection 3, the injector opens. The current reaches a plateau value indicated by circle B, after which the voltage applied is chopped, to maintain the reductant injector in an open position. The current through the injector then begins to fall as shown in the plot. At time C the voltage across the injector is set negative and the doser begins to close; the current rapidly decreases to a level close to zero. So during this time the injector closes.

The trace of the current is often analysed to provide useful data. As shown in FIG. 1 there is a point of inflection/glitch 3 observed within circle A. The first and or second derivative of current I can identify this glitch/point of infection. The value of dI/dt is at a maxima at this point. It is known to detect the start of injection from (as) this point of inflection, in the current trace, which indicates of movement of the doser valve i.e. valve opening.

Figure 2:
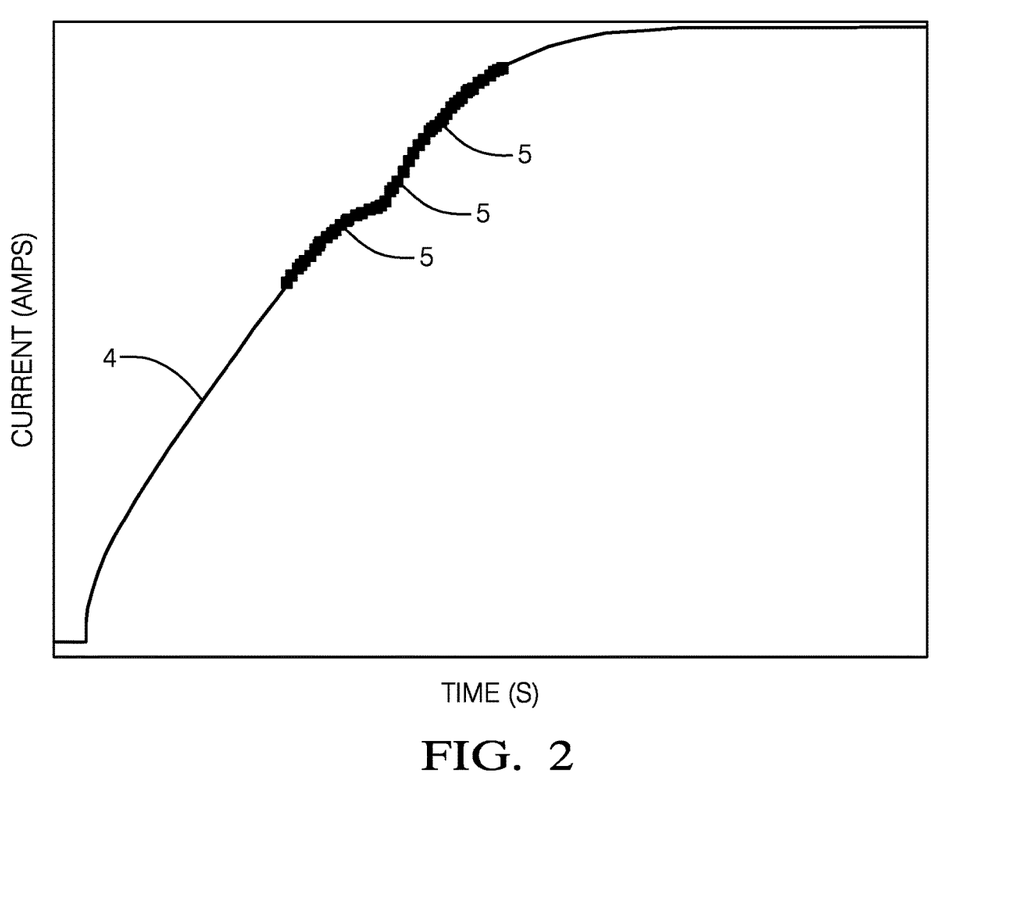
FIG. 2 shows a plot of the filtered current through the solenoid of a reductant doser and sampling points.

FIG. 2 shows a plot of the filtered current 4 through the solenoid of a reductant doser and the current is typically sampled around the glitch (point of inflection) and the small squares 5 show the sampling points. The figure shows sampling times with 20 µS current samples (frequency), so in this example the resolution of the start of injection detection is 20 µS.

Figure 3:
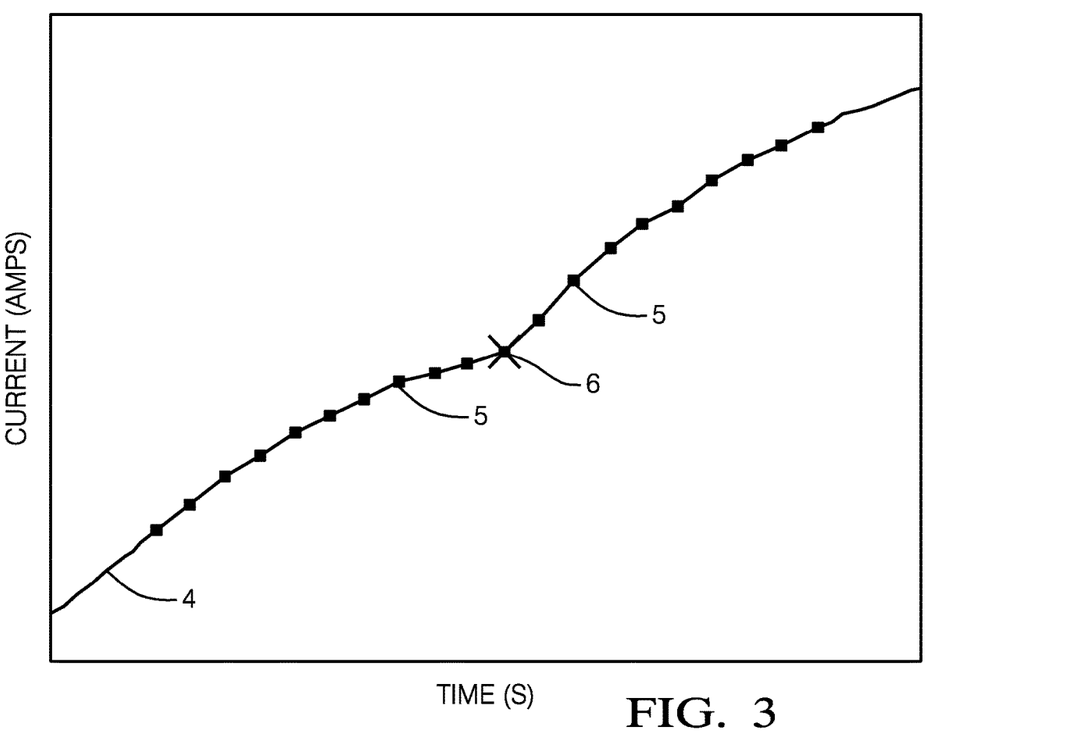
FIG. 3 shows a plot of current where sampling is performed around the start of injection.
Figure 4:
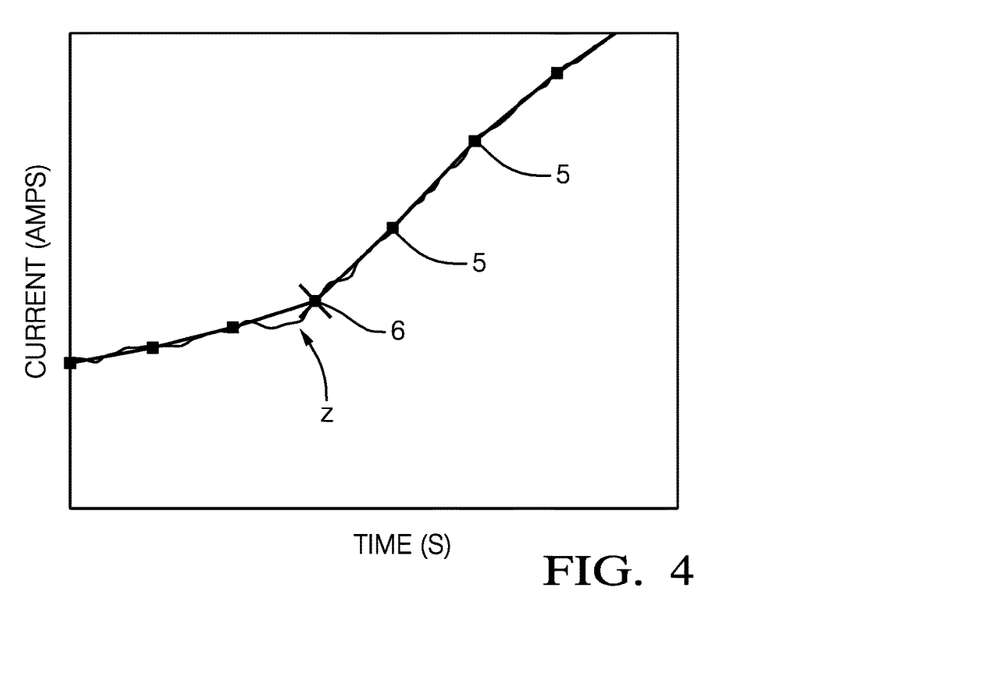
FIG. 4 shows the region of FIG. 3 around the start of injection enlarged.

FIG. 3 shows a plot of current where sampling is performed. In the following examples we consider the case where current sampling every 40 µs shown by the small rectangles. The start of injection determined by the sampling is shown by the cross 6; ie. at his sampling point; FIG. 4 shows the region around the start of detection enlarged. This figure shows the situation with 40 µs samples and the SOI being detected at a (sampling) point 6 later than the actual SOI, the later indicated by Z. Thus the actual point of inflection (SOI) does not coincide with the sampling point.

Figure 5:
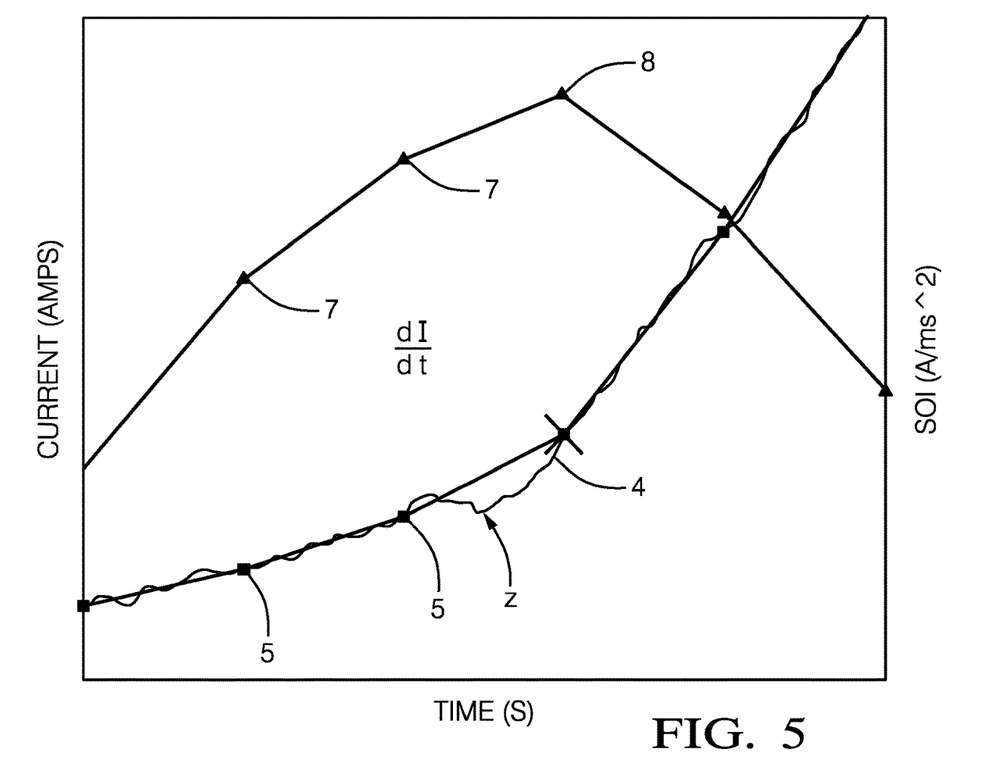
FIG. 5 shows an example of the plot of FIG. 4 in even further detail in the region of the start of injection point.

FIG. 5 shows an example of the plot of FIGS. 4 and 5 in even further detail in the region of the start of injection point. As well as the sampling points the figures also shows the values of dI/dt 7 at the sampling points, which is the derivative of current and achieves its maximum at the point of inflection. The trace shows the plots of dI/dt at the sampled points and the maximum values in the samples is achieved at point 8; i.e. at this sampling point. So this figure shows a known method of detecting the SOI (the point of inflection in the current trace)

The "SOI detect" signal is the rate of change in current (current acceleration). The maximum of this current acceleration is considered the SOI position. It is seen the actual SOI denoted at point of inflection Z is somewhat earlier than this point.

Although the sampling frequency cannot be improved, in methodology according to aspects, the current sample points are shifted in time (earlier or later) with the aim of getting a current sample point as near coincident with the actual SOI point. In other words the methodology changes/adapts the synchronisation (shifts) of sampling to best capture the actual SOI.

In detailed aspects various methods may be used to determine the shifts in sampling (in which direction and by how much).

A first method is to look at the values of dI/dt (change in current) in the samples preceding and following the sample point of maximum value (i.e. before and after the detected SOI as this data is already calculated.

Figure 6:
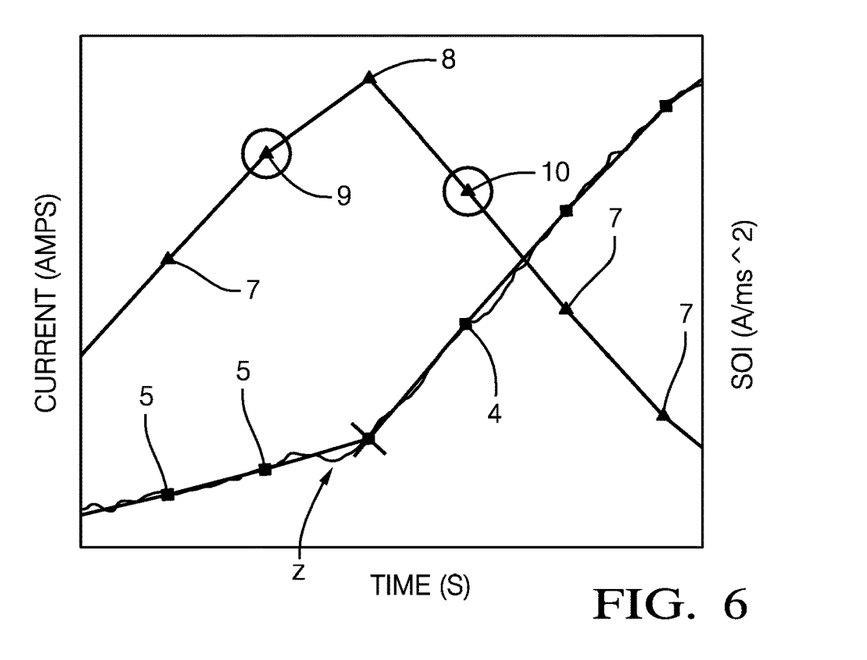
FIGS. 6, 7, 8 9 and 10 shows figures similar to FIGS. 3, 4, and 5 with varying shifts in sampling times.

FIG. 6 shows a figure similar to FIGS. 3, 4, and 5 with like reference numerals and the sampling point of maximum value of dI/dt shown again by reference 8; the circles show the sampling points flanking this point. As can be seen the value of dI/dt for the sampling point 9 which precedes the sampling point taken to be the point of injection 8 is higher in value than the value for the following sampling point 10. Ideally the values of dI/dt for these two flanking sampling points 9 and 10 should be the same, as the intermediate sampling point 8 (taken to be the start of the injection) located halfway between the two, and if this is the case point 8 is most likely to be then coincident with the actual start of injection Z. So in order to set sampling times the following methodology can be used.

Example Method

Initial Methodology

A signal of the current through the solenoid of the injector (doser) is obtained. At set sampling points (i.e. in a predetermined short window spaced by the sampling interval (=sampling frequency)) the values of dI/dt are determined. Then the sampling point (z) where the dI/dt is highest is selected and taken to be the point of inflection i.e. the time of the start of injection. (This is equivalent to point 8 of FIG. 6)

Subsequent Shifting of Sampling Window

Following this if the value of dI/dt (z−1) of the sampling point (z−1) immediately prior to the sampling point found for the start of injection (z) (equivalent to point 9 in FIG. 6) has a value of dI/dt equal (or within a predetermined threshold) to the value of dt/dI(z+1) for the sampling point (z+1) immediately following i.e. subsequent to the sampling point of the start of injection (z), (equivalent of pint 10) then the sampling window (i.e. sampling points) is in the optimum position/synchronisation.

If the value of dI/dt (z−1) at the sampling point (z−1) immediately prior to the sampling point found for the start of injection (z) has a value greater than the value of dt/dI(z+1) for the sampling point (z+1) following (i.e. subsequent to) the sampling point of the start of injection (z) then the sampling window (i.e. sampling points) is shifted to an slightly earlier position i.e. sampling times shifted by an increment backward in time. If the value of dI/dt (z−1) at the sampling point immediately prior to the sampling point (z−1) found for the start of injection (z) has a value less than (or less than a predetermined threshold) to the value of dt/dI(z+1) for the sampling point (z+1) immediately following (subsequent to) the sampling point of the start of injection (z), then the sampling window (i.e. sampling points) are shifted to a slightly later position i.e. sampling times shifted by an increment forward in time.

Figure 7:
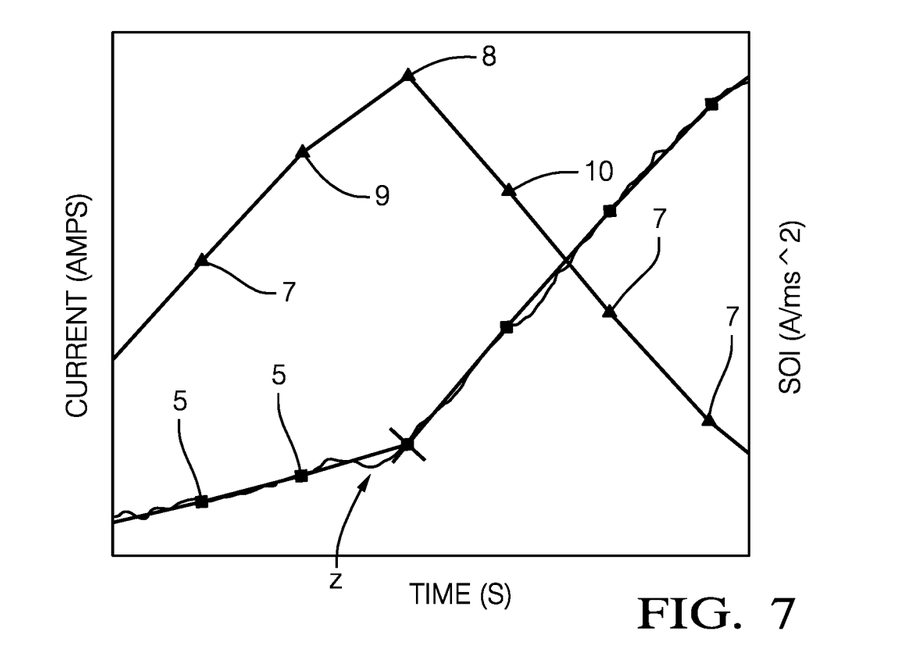

FIG. 7 shows the results and is a figure similar to FIG. 6 with like reference numerals; with the windows start time reduced by 5 µs. This reduces slightly the timespan between the actual time of injection (shown by Z) and the detected time of injections, at the sampling point 8 shown by the cross.

Figure 8:
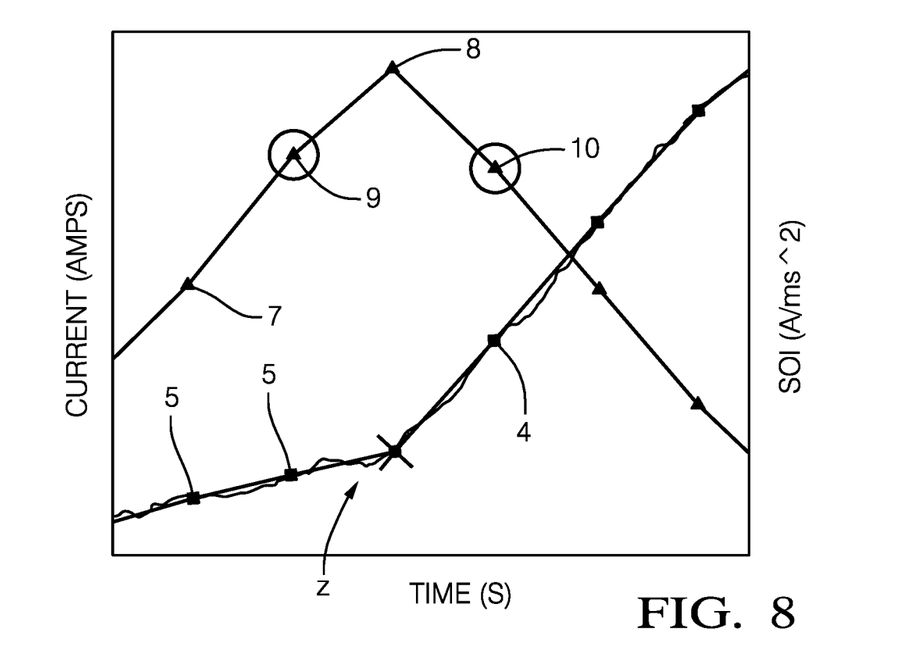

FIG. 8 shows the results with respect to FIG. 6 with like reference numerals; where the window start time reduced by 10 µs. This further reduces slightly the timespan between the actual time of injection and the detected time of injections.

Figure 9:
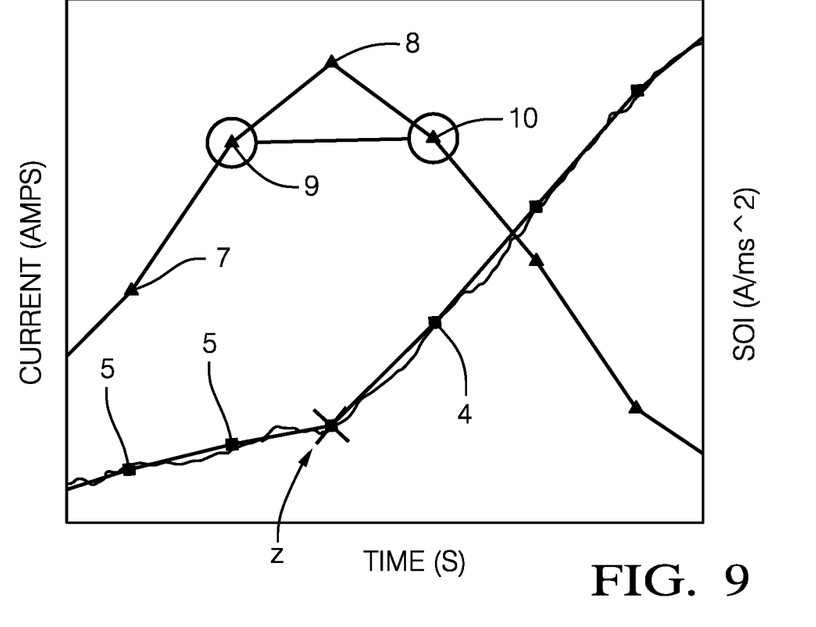
Figure 10:
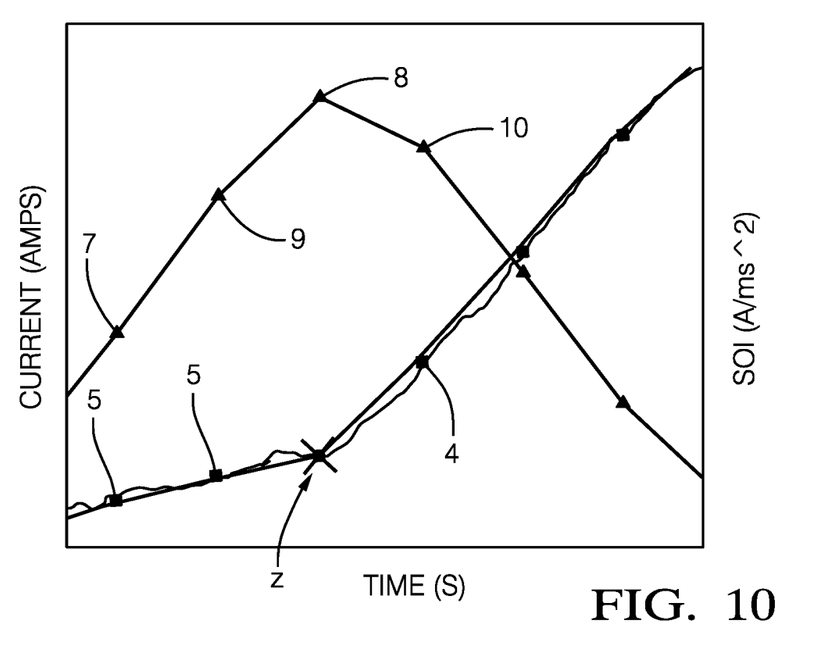

FIG. 9 shows the results with respect to FIG. 6 with like reference numerals; where the windows start time reduced by 15 µs. As can be seen in FIG. 9, the actual time point of the start of injection Z is now co-incident with the sampling point which detects the point of detection shown by cross X. The values of dI/dt at the sampling points 9, 10 flanking the detected point of detection 8 have the same value, indicated by the horizontal line, so this indicates the sampling synchronisation is optimum. FIG. 10 shows the results with respect to FIG. 4 where the windows start time reduced by 20 µs. Here the window start time reduced too much as the value of dI/dt at the preceding sampling point 9 to the SOI detect sampling point 8 is lower than the value of dI/dt for the subsequent sampling point 10 to the SOI sampling point 8. In this case the sampling points (time window has to be shifted forward in time by an increment).

The invention claimed is:

1. A method of adaptively sampling data to determine a start of injection in a solenoid actuated valve of a fluid injector comprising:
   a) in an operating cycle or portion thereof of said solenoid actuated valve, sampling a signal of current through a solenoid of the solenoid actuated valve at sampling points, said sampling points having a pre-defined interval therebetween;

b) at each of said sampling points, determining a value of a first derivative of the current;
c) detecting a sampling point at which the value of the first derivative achieves a maximum and determining this sampling point as the start of injection;
d) determining the value of the first derivative at a sampling point immediately preceding said sampling point of step c);
e) determining the value of the first derivative at a sampling point immediately following said sampling point of step c);
f) in a subsequent operating cycle, altering a synchronisation of sampling to shift sampling times time wise depending on the values found in steps d) and e).

2. A method as claimed in claim 1 wherein in step f) if the value in step d) is greater than the value in step e), shifting sampling times earlier in time by a set increment.

3. A method as claimed in claim 2 wherein in step f) if the value in step d) is smaller than the value in step e), shifting sampling times forward in time by a set increment.

4. A method as claimed in claim 3 where said injector is a reductant injector adapted to inject liquid reductant into an exhaust of a vehicle.

5. A method as claimed in claim 1 wherein in step f) if the value in step d) is smaller than the value in step e), shifting sampling times forward in time by a set increment.

6. A method as claimed in claim 5 where said injector is a reductant injector adapted to inject liquid reductant into an exhaust of a vehicle.

7. A method as claimed in claim 1 where said injector is a reductant injector adapted to inject liquid reductant into an exhaust of a vehicle.

\* \* \* \* \*